United States Patent [19]

Spanoudis

[11] 4,002,449
[45] Jan. 11, 1977

[54] METHOD OF MELTING LASER GLASS COMPOSITIONS

[75] Inventor: Louis Spanoudis, Toledo, Ohio

[73] Assignee: Owens-Illinois, Inc., Toledo, Ohio

[22] Filed: May 21, 1975

[21] Appl. No.: 579,300

[52] U.S. Cl. .................................. 65/32; 65/136; 106/47 Q; 106/52
[51] Int. Cl.² ......................................... C03B 5/22
[58] Field of Search .................. 65/32, 136, 135; 106/47 Q, 52

[56] References Cited

UNITED STATES PATENTS

| | | | |
|---|---|---|---|
| 3,471,409 | 10/1969 | Lee et al. ................................ | 106/52 |
| 3,716,349 | 2/1973 | Deeg et al. ............................. | 65/32 |
| 3,871,853 | 3/1975 | Dietz et al. ............................ | 65/32 |

OTHER PUBLICATIONS

Government Report AD 643259 "Preparation of Platinum Free Laser Glass", Semi-Annual Technical Report, Jan. 1–July 31, 1966, ARPA, order No. 306–362, Project Code No. 4730, Contract Nonr 4656(00), by Research Division of the American Optical Co., Southbridge, Mass. by R. F. Woodcock et al.

*Primary Examiner*—Arthur D. Kellogg
*Attorney, Agent, or Firm*—Richard D. Heberling; E. J. Holler

[57] ABSTRACT

A method is disclosed of melting laser glass compositions that includes double melting steps as follows:

I. melting the glass composition in a ceramic container in an oxidizing atmosphere in which the partial pressure of oxygen is greater than about $10^{-3}$ atmospheres; and II. melting the resultant melt of Step I in a platinum container containing at least about 50% by weight of platinum in a reducing atmosphere in a buffered gas mixture in which the partial pressure of oxygen is less than about $10^{-3}$ atmospheres for a time sufficient to obtain a homogenization of the glass with stirring and still having the ingredients of the glass composition in an oxidized state to thereby produce a laser article substantially free from detrimental, lower-valence state ingredients, such as $Fe^{++}$, and a minimum of platinum inclusions in the glass.

The method may also include double steps as follows:

I. providing a premelted glass laser composition in a highly-oxidized state in which the ingredients are highly oxidized; and II. thereafter melting the highly-oxidized glass of Step I as above indicated in a reducing atmosphere in a buffered gas mixture in a platinum container for a time sufficient to provide a homogenized glass and still have the glass composition ingredients in a highly oxidized state.

13 Claims, No Drawings

METHOD OF MELTING LASER GLASS COMPOSITIONS

THE INVENTION

The present invention is directed to a method of melting laser glass compositions so as to produce a laser article thereof that is substantially free from detrimental, lower valence state ingredients, such as $Fe^{++}$ and also an article which has a minimum of platinum inclusions in the glass.

The invention more particularly relates to a method of melting laser glass that includes double melting steps in which there is a glass composition melted in an oxidizing atmosphere in a ceramic container, and thereafter remelting the resultant melt in a platinum container in a reducing atmosphere in a buffered gas mixture for a time sufficient to obtain homogenization of the glass with stirring and still have all the ingredients of the glass in an oxidized state to thereby produce the laser glass article substantially free from lower valence state ingredients, such as $Fe^{++}$.

There has been a problem in the laser glass melting processor of keeping undesirable platinum inclusions to a minimum as well as keeping the glass free from other detrimental ingredients such as lower valence state $Fe^{++}$.

It has been particularly difficult to make high-quality glass laser rods by melting in a platinum container or furnace without an undesirable amount of platinum inclusions and lower valence state ingredients, such as $Fe^{++}$, especially with those glasses that have a rather high lithium content in the neighborhood of 15–30 mole percent, based on the total glass composition.

It is an object of the present invention to provide a method for melting laser glass compositions by double melting steps, the method providing a final glass laser article that is substantially free from detrimental lower valence state ingredients, such as $Fe^{++}$, and has a minimum of platinum inclusions.

It is an object of the present invention to provide a method of melting laser glass compositions that includes double melting steps, the method comprising the steps of:

I. melting the glass composition in a ceramic container in an oxidizing atmosphere in which the partial pressure of oxygen is greater than about $10^{-3}$ atmospheres; and II. melting the melted glass of Step I in a platinum container containing at least about 50% by weight of platinum in a reducing atmosphere in a buffered gas mixture in which the partial pressure of oxygen is less than about $10^{-3}$ atmospheres for a time sufficient to obtain homogenization in the glass with stirring and still have the ingredients of the glass composition in an oxidized state to thereby produce a glass article substantially free from detrimental lower valence state ingredients and having a minimum of platinum inclusions in the glass.

It is an object of the present invention to provide a method of making a lithia oxide-alkaline earth oxide-silicate laser glass composition by a double step, the double method step including:

I. melting the glass composition in a separate substantially iron-free ceramic container in an oxidizing atmosphere in which the partial pressure of oxygen is greater than about $10^{-3}$ atmospheres; and II. melting the resultant melt of Step I in a platinum container in which the partial pressure of oxygen is less than about $10^{-3}$ atmospheres in a buffered gas mixture for a time sufficient to obtain homogenization and still have glass composition ingredients in an oxidized state to thereby produce a glass substantially free from detrimental lower valence state ingredients and having a minimum of platinum inclusions.

It is an object of the present invention to provide a method of melting laser glass compositions that includes the following steps:

I. providing a pre-melted laser glass composition in a highly oxidized state in which the ingredients are all highly oxidized; and II. melting the highly-oxidized glass of Step I in a platinum container in a reducing atmosphere in a buffered gas mixture, the reducing atmosphere being one in which the partial pressure of oxygen is less than about $10^{-3}$ atmospheres, the melting being done for a time sufficient to obtain homogenization of the glass with stirring and still have the ingredients of the glass composition in an oxidized state.

These and other objects will be apparent from the specification that follows and the appended claims.

The present invention provides a method of melting laser glass compositions so that the final glass laser article is substantially free from detrimental lower valence state ingredients, such as $Fe^{++}$, and also has a minimum of platinum inclusion ingredients in the laser glass article. The above double-step method preferably includes the following steps:

I. providing a melted laser glass composition in a highly oxidized state in which the ingredients are all highly oxidized or melting the laser glass composition in a ceramic container in an oxidizing atmosphere in which the partial pressure of oxygen is greater than about $10^{-3}$ atmospheres; and II. melting the resultant melt of Step I in a platinum container containing at least about 50% by weight of platinum in a reducing atmosphere in a buffered gas mixture in which the partial pressure of oxygen is less than about $10^{-3}$ atmospheres for a time sufficient to obtain homogenization of the glass with stirring and still have the ingredients of the glass composition in an oxidized state to thereby produce a laser glass article substantially free from detrimental lower valence state ingredients, such as $Fe^{++}$ and having a minimum of platinum inclusions therein.

Suitable laser glass compositions are set forth in U.S. Pat. Nos. 3,457,182 and 3,471,409 and disclosed to Lee and Rapp, the disclosures of each of these patents being hereby incorporated by reference.

The laser glass compositions can be melted in an apparatus such as disclosed in U.S. Pat. No. 3,656,924 to Chapman and LeSueur, and the disclosure of this patent is hereby incorporated by reference.

The second melting step of the present invention is one that is conducted in a reducing atmosphere in a buffered gas mixture. This step of melting in a platinum container under reducing conditions is disclosed in U.S. Pat. Nos. 3,837,828 and 3,871,853 to Dietz and Wengert. Both of these U.S. patents are hereby incorporated by reference for their disclosure of the second step of the present invention.

A preferred glass laser composition comprises the following ingredients in approximate mole percentages:

| Ingredients | Mole Percent |
| --- | --- |
| SiO$_2$ | 45 – 70 |
| Li$_2$O | 15 – 35 |
| CaO | 1/2 – 30 |
| Nd$_2$O$_3$ | 1/10 – 2 |
| Al$_2$O$_3$ | 0 – 8 | wherein the total amount of Li$_2$O and CaO is not substantially higher than about 50 mole percent; when the Li$_2$O is present at about 15 mole percent, the amount of CaO is at least about 10 mole percent; and when the CaO is at about ½ mole percent, the amount of Li$_2$O is at least about 24 mole percent. Preferred compositions containing ingredients in narrower ranges than the composition set forth above are the following, as expressed in approximate mole compositions:

| Ingredients | Mole Percent |
| --- | --- |
| SiO$_2$ | 48 – 65 |
| Li$_2$O | 20 – 30 |
| CaO | 5 – 25 |
| Nd$_2$O$_3$ | 1/10 – 2 |
| Al$_2$O$_3$ | 0 – 8 |

One of the most preferred laser glass compositions for melting by the double step of the present invention is the following glass composition comprising the following ingredients in approximate mole percentages:

| Ingredients | Mole Percent |
| --- | --- |
| SiO$_2$ | 60 |
| Al$_2$O$_3$ | 2.5 |
| Li$_2$O | 27.5 |
| CaO | 10 |
| Nd$_2$O$_3$ | 0.5 |
| CeO$_2$ | 0.16 |

The first step of the present invention is an oxidizing step so that the melted glass resulting therefrom will have the ingredients in a highly oxidized state. This oxidizing step is conducted preferably in a substantially iron-free ceramic container which is preferably silica in a reducing atmosphere, in which the partial pressure of oxygen is greater than about $10^{-3}$.

In accordance with this invention, and as set forth in the previously mentioned Dietz & Wengert U.S. Pat. Nos. 3,857,828 and 3,871,853, the reducing atmosphere is one in which the partial pressure of oxygen is less than about $10^{-3}$ atmospheres. As is described in the above patents, a buffered gas mixture, such as CO/CO$_2$, is used for controlling the reducing atmosphere and maintaining the partial pressure of oxygen less than about $10^{-3}$ atmospheres.

Controlling the reducing atmosphere with the buffered gas mixture is described in the above-mentioned Dietz & Wengert patents. This involves reactions with three gases (reducing and buffering reactions) such as the following equation:

$$2H_2(g) + O_2(g) \leftrightarrows 2H_2O(g)$$

In the above case, two gaseous elements; namely, H$_2$ and O$_2$, react to give a gaseous compound — namely, H$_2$O. The partial pressure of one element, say O$_2$ at a given temperature, can be controlled by adjusting the partial pressure for the other element and the compound. This properly can be used in buffering partial pressures of elements, including oxygen, and values that can be immediately obtained with pure elements and for reducing compounds with H$_2$ and CO. Buffered gas mixtures include CO/CO$_2$, H$_2$/H$_2$O, CO$_2$/NH$_3$, CO$_2$/H$_2$, H$_2$O/NH$_3$ and H$_2$O/CO. Preferably, in a preferred buffered gas mixture, such as CO/CO$_2$ and H$_2$/H$_2$O, the reducing gas, such as CO or H$_2$, comprises the majority of the mixture, and preferably about 5–10% of the mixture is CO$_2$ or H$_2$O, the best results generally being obtained around 8 or 9 to 10% of CO$_2$ in the CO/CO$_2$ mixture or 10% H$_2$O in the H$_2$/H$_2$O mixture.

Excellent results were obtained by introducing into the container atmosphere above the melt a buffered gas mixture made by bubbling a mixture of nitrogen and hydrogen through water. This buffered gas mixture was used to provide the reducing atmosphere and control the partial pressure of oxygen in the melting step under reducing conditions in a platinum-lined container or furnace.

In the present invention, the laser glass batch is premelted or otherwise provided in a premelted glass form by, for instance, melting in an iron-free silica or other ceramic crucible under highly-oxidizing conditions. This highly-oxidizing condition converts any lower valence species to the higher valence form, for example, converting Fe$^{++}$ to Fe$^{+++}$. This highly oxidizing step also converts any platinum or other noble metals present in the batch's impurities into the oxide forms in the glass. Thereafter, according to the present invention, the second melting step is conducted to remelt in a platinum crucible furnace with stirring under reducing conditions in a buffered gas atmosphere in which there is a low partial pressure of oxygen for a temperature and time sufficient to obtain the homogenization necessary and yet for a time and temperature sufficient to allow the glass to be at an oxidized state even at the end of the melting cycle under reducing conditions. The time is generally about 1 to 8 hours or more for a silicate glass. Using the double step of the present invention, it is possible to melt the glass and yet have the platinum in the dissolved state at the end of the cycle, rather than have the platinum present as undesirable metallic inclusions. Also, the iron is in its higher valence state, rather than at its undesirable lower valence state where it would be an infrared absorber.

EXAMPLE

A glass laser composition, in the amount of 250 grams, was melted, the composition having the following ingredients in mole percent:

| Ingredients | Mole Percent |
| --- | --- |
| SiO$_2$ | 60 |
| Al$_2$O$_3$ | 2.5 |
| Li$_2$O | 27.5 |
| CaO | 10 |
| Nd$_2$O$_3$ | 0.5 |
| CeO$_2$ | 0.16 |

The glass composition was melted under oxidizing conditions, in a substantially iron-free silica crucible, thus placing the ingredients of the glass in a highly-oxidized state. This premelted glass, having its ingredients in a highly-oxidized state, was then melted in a platinum container having a reducing atmosphere composed of the buffered gas mixture of $H_2O/H_2/N_2$. A hydrogen-nitrogen mixture was bubbled through water and mixed with nitrogen to form the furnace melting atmosphere. The melt was heated and stirred with the buffered gas mixture having about 8% to 10% $H_2O$. After four hours, the glass was removed from the melt and cast into the form of a small billet and a laser rod core-drilled from the billet. The glass was then annealed at 900° F. for 4 hours and thereafter tested at room temperature, the tests indicating that the laser article was substantially free from detrimental lower state valence ingredients such as $Fe^{++}$ and had a minimum of platinum inclusions. The platinum dissolved in the glass was apparently in solution and did not appear as undesirable platinum sparklers.

What is claimed is:

1. A method of melting laser glass compositions that includes double melting steps, the method comprising the steps of:
   I. melting the glass composition in a ceramic container in an oxidizing atmosphere in which the partial pressure of oxygen is greater than about $10^{-3}$ atmospheres for a time sufficient to oxidize the ingredients of the glass composition to a higher valence state; and
   II. melting the resultant melt of Step I in a platinum container containing at least about 50% by weight of platinum in a reducing atmosphere in a buffered gas mixture of the group consisting of $CO/CO_2$, $H_2/H_2O$, $CO_2/NH_3$, $CO_2/H_2$, $H_2O/NH_3$ and $H_2O/CO$ and mixtures thereof in which the partial pressure of oxygen is less than about $10^{-3}$ atmospheres for a time sufficient to obtain homogenization of the glass with stirring and still have the ingredients of the glass composition in an oxidized state to thereby produce a laser article substantially free from detrimental lower valence state ingredients, such as $Fe^{++}$, and a minimum of platinum inclusions in the glass.

2. A method as defined in claim 1 in which the laser glass composition comprises the following ingredients in approximate mole percentages:

| Ingredients | Mole Percent |
| --- | --- |
| $SiO_2$ | 45 – 70 |
| $Li_2O$ | 15 – 35 |
| $CaO$ | 1/2 – 30 |
| $Nd_2O_3$ | 1/10 – 2 |
| $Al_2O_3$ | 0 – 8 | wherein the total amount of $Li_2O$ and $CaO$ is not substantially higher than about 50 mole percent; when the $Li_2O$ is present at about 15 mole percent, the amount of $CaO$ is at least about 10 mole percent; and when the $CaO$ is at about ½ mole percent, the amount of $Li_2O$ is at least about 24 mole percent.

3. A method as defined in claim 1 in which the following ingredients are present in approximate mole percentages in the glass composition:

| Ingredients | Mole Percent |
| --- | --- |
| $SiO_2$ | 48 – 65 |
| $Li_2O$ | 20 – 30 |
| $CaO$ | 5 – 25 |
| $Nd_2O_3$ | 0.1 – 2 |
| $Al_2O_3$ | 0 – 8 |

4. A method as defined in claim 1 in which the laser glass composition comprises the following ingredients in approximate mole percentages:

| Ingredients | Mole Percent |
| --- | --- |
| $SiO_2$ | 60 |
| $Al_2O_3$ | 2.5 |
| $Li_2O$ | 27.5 |
| $CaO$ | 10 |
| $Nd_2O_3$ | 0.5 |
| $CeO_2$ | 0.16 |

5. A method of melting a lithia oxide-alkaline earth oxide-silicate laser glass composition to provide a laser article with a minimum of platinum inclusions and dissolved platinum, the glass composition being melted in a platinum container containing at least about 50% by weight of platinum; the improvement comprising the steps of:
   I. melting the glass composition in a separate substantially iron-free ceramic container in an oxidizing atmosphere in which the partial pressure of $O_2$ is greater than about $10^{-3}$ atmospheres, for a time sufficient to oxidize the ingredients of the glass composition to a higher valence state; and
   II. melting again the resultant melt of Step I in the platinum container in a reducing atmosphere in a buffered gas mixture of the group consisting of $CO/CO_2$, $H_2/H_2O$, $CO_2/NH_3$, $CO_2/H_2$, $H_2O/NH_3$ and $H_2O/CO$ and mixtures thereof in which the partial pressure of oxygen is less than about $10^{-3}$ atmospheres for a time sufficient to obtain homogenization and still have glass composition ingredients in an oxidized state to thereby produce a laser article substantially free from detrimental lower valence state ingredients, such as $Fe^{++}$, and a minimum of platinum inclusions.

6. A method as defined in claim 5 in which the ceramic container is a silica container.

7. A method as defined in claim 5 in which the buffered gas mixture is $H_2/H_2O$.

8. A method as defined in claim 1 in which highly-oxidized ingredients for the glass composition for premelted glass in a highly oxidized state is added to the melt during Step II.

9. A method as defined in claim 8 in which the highly-oxidized ingredients include lithium nitrate.

10. A method as defined in claim 9 in which the highly-oxidized ingredients include $CeO_2$.

11. A method of melting laser glass compositions that includes the following steps:
   I. providing a premelted glass composition in a highly-oxidized state in which the ingredients are in a higher valence state; and
   II. melting the highly-oxidized glass of Step I in a platinum container containing at least about 50% by weight of platinum in a reducing atmosphere in a buffered gas mixture of the group consisting of $CO/CO_2$, $H_2/H_2O$, $CO_2/NH_3$, $CO_2/H_2$, $H_2O/NH_3$ and $H_2O/CO$ and mixtures thereof, the reducing atmosphere being one in which the partial pressure of oxygen is less than about $10^{-3}$ atmospheres, the melting being done for a time sufficient to obtain homogenization of the glass with stirring and still have the ingredients of the glass composition in an oxidized state to thereby produce a laser article substantially free from detrimental lower valence state ingredients, such as $Fe^{++}$, and having a minimum of platinum inclusions in the laser glass article.

12. A method as defined in claim 11 in which the highly oxidized, premelted glass composition contains the following ingredients in approximate mole percentages:

| Ingredients | Mole Percent |
| --- | --- |
| $SiO_2$ | 45 - 70 |
| $Li_2O$ | 15 - 35 |
| $CaO$ | 1/2 - 30 |
| $Nd_2O_3$ | 1/10 - 2 |
| $Al_2O_3$ | 0 - 8 |

13. A method as defined in claim 11 in which the buffered gas mixture includes a mixture of hydrogen, water vapor and nitrogen, a hydrogen-nitrogen mixture being bubbled through water to provide the buffered gas mixture in Step II.

* * * * *